US008055735B2

(12) United States Patent
Krishnappa et al.

(10) Patent No.: US 8,055,735 B2
(45) Date of Patent: Nov. 8, 2011

(54) METHOD AND SYSTEM FOR FORMING A CLUSTER OF NETWORKED NODES

(75) Inventors: Nagendra Krishnappa, Kamataka (IN); Asha Ramamurthy Yarangatta, Karnataka (IN); Avishek Chakravarti, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 12/252,190

(22) Filed: Oct. 15, 2008

(65) Prior Publication Data

US 2009/0113034 A1    Apr. 30, 2009

(30) Foreign Application Priority Data

Oct. 30, 2007   (IN) ............................ 2470/CHE/2007

(51) Int. Cl.
*G06F 15/177* (2006.01)
(52) U.S. Cl. ........................................................ 709/220
(58) Field of Classification Search ........... 709/220–226
See application file for complete search history.

(56) References Cited

U.S. PATENT DOCUMENTS

| | | | | |
|---|---|---|---|---|
| 6,597,956 B1* | 7/2003 | Aziz et al. | ........................... | 700/3 |
| 6,965,957 B1* | 11/2005 | Nguyen | ........................ | 710/100 |
| 7,016,946 B2* | 3/2006 | Shirriff | ........................... | 709/221 |
| 7,120,821 B1* | 10/2006 | Skinner et al. | .................. | 714/4.4 |
| 7,260,716 B1* | 8/2007 | Srivastava | ..................... | 713/163 |
| 7,281,154 B2* | 10/2007 | Mashayekhi et al. | ........ | 714/4.11 |
| 7,406,517 B2* | 7/2008 | Hunt et al. | .................... | 709/224 |
| 7,421,578 B1* | 9/2008 | Huang et al. | ................... | 713/163 |
| 7,469,279 B1* | 12/2008 | Stamler et al. | ................ | 709/221 |
| 7,490,089 B1* | 2/2009 | Georgiev | ............................. | 1/1 |
| 7,870,230 B2* | 1/2011 | Rao et al. | ....................... | 709/220 |
| 2002/0042693 A1* | 4/2002 | Kampe et al. | ................. | 702/186 |
| 2003/0041138 A1* | 2/2003 | Kampe et al. | ................. | 709/223 |
| 2003/0126202 A1* | 7/2003 | Watt | ............................. | 709/203 |
| 2003/0145050 A1* | 7/2003 | Block et al. | ..................... | 709/204 |
| 2003/0158936 A1* | 8/2003 | Knop et al. | ..................... | 709/224 |
| 2004/0049573 A1* | 3/2004 | Olmstead et al. | ............. | 709/224 |
| 2004/0205148 A1* | 10/2004 | Bae et al. | ....................... | 709/213 |
| 2005/0021688 A1* | 1/2005 | Felts et al. | ..................... | 709/220 |
| 2005/0102676 A1* | 5/2005 | Forrester | ....................... | 718/105 |
| 2005/0132154 A1* | 6/2005 | Rao et al. | ....................... | 711/162 |
| 2006/0053216 A1* | 3/2006 | Deokar et al. | ................ | 709/223 |
| 2008/0250267 A1* | 10/2008 | Brown et al. | ....................... | 714/4 |

OTHER PUBLICATIONS

"LifeKeeper for Linux 6", SteelEye Technology Inc; Apr. 2007.
"Sun Cluster System Administration Guide for Solaris OS", Sun Microsystems, Inc.; May 2007.

* cited by examiner

*Primary Examiner* — Faruk Hamza
*Assistant Examiner* — Shirley Zhang

(57) ABSTRACT

A system and a method for automatic cluster formation by automatically selecting nodes based on a selection criteria configured by the user is disclosed. During a cluster re-formation process, a failed node may automatically get replaced by one of the healthy nodes in its network, which is not part of any cluster avoiding cluster failures. In case of a cluster getting reduced to a single node due to node failures and failed nodes could not be replaced due to non-availability of free nodes, the single node cluster may be merged with a existing healthy clusters in the network providing a constant level of high availability. The proposed method may also provide an affective load balancing by maintaining a constant number of member nodes in a cluster by automatically replacing the dead nodes with a healthy node.

24 Claims, 8 Drawing Sheets

METHOD AND SYSTEM FOR FORMING A CLUSTER OF NETWORKED NODES

BACKGROUND OF INVENTION

A cluster is a collection of one or more complete systems, having associated processes, that work together to provide a single, unified computing capability. The perspective from the end user, such as a business, is that the cluster operates as through it were a single system. Work can be distributed across multiple systems within the cluster. Any single outage, whether planned or unplanned, in the cluster will not disrupt the services provided to the end user. That is, end user services can be relocated from system to system within the cluster in a relatively transparent fashion.

Generally, before taking advantage of the dependable accessibility benefits permitted by clustering technology, a cluster requires configuration, a task possibly undertaken by a system administrator. Configuring a cluster requires a determination of what are the cluster member configurations and on which nodes, i.e., application server middleware installations, these configurations reside. As a result, in many systems, cluster configuration is basically static, and, even presuming that the static configuration is error free, which may not be true, configuring still requires a system administrator to outlay significant time and planning. This time and planning is costly, and even more costly if errors exist requiring even more time and planning to correct an error in cluster configuration.

Clusters may also be used to address problems of data ownership and data consistency when failures occur in a cluster. A dynamic cluster involves changes in the membership of the cluster over time. Such changes may occur as a result of failures and dynamic cluster membership management involves tracking the membership of a cluster. Failure events may include node failures in a network, unresponsive nodes or processes, process failures, events preventing a node from operating in a cluster, or other events that can lead to a non-functioning cluster. Changes in the cluster may occur when members rejoin or new members join the cluster, affecting the relationship between cluster participants.

One solution for dynamic cluster membership is a centralized master and slave topology, for example a star topology. However, using a single centralized master and multiple slaves, i.e. a star topology with the central node acting as the master, may create a bottleneck. Such at topology may negatively impact scalability, and frequent data updates between master and slaves may result in lower performance. The ability of slaves to get membership information about each other may be limited. The failure of the central node itself may spawn complex computing problems, particularly in the event of multiple node failures. Addressing node failure may include implementing leader elections by remaining nodes, for example.

BRIEF DESCRIPTION OF THE DRAWINGS

Embodiments of the invention will now be described, by way of example, with reference to the accompanying drawings, in which.

DETAIL DESCRIPTION OF THE INVENTION

Figure 1:
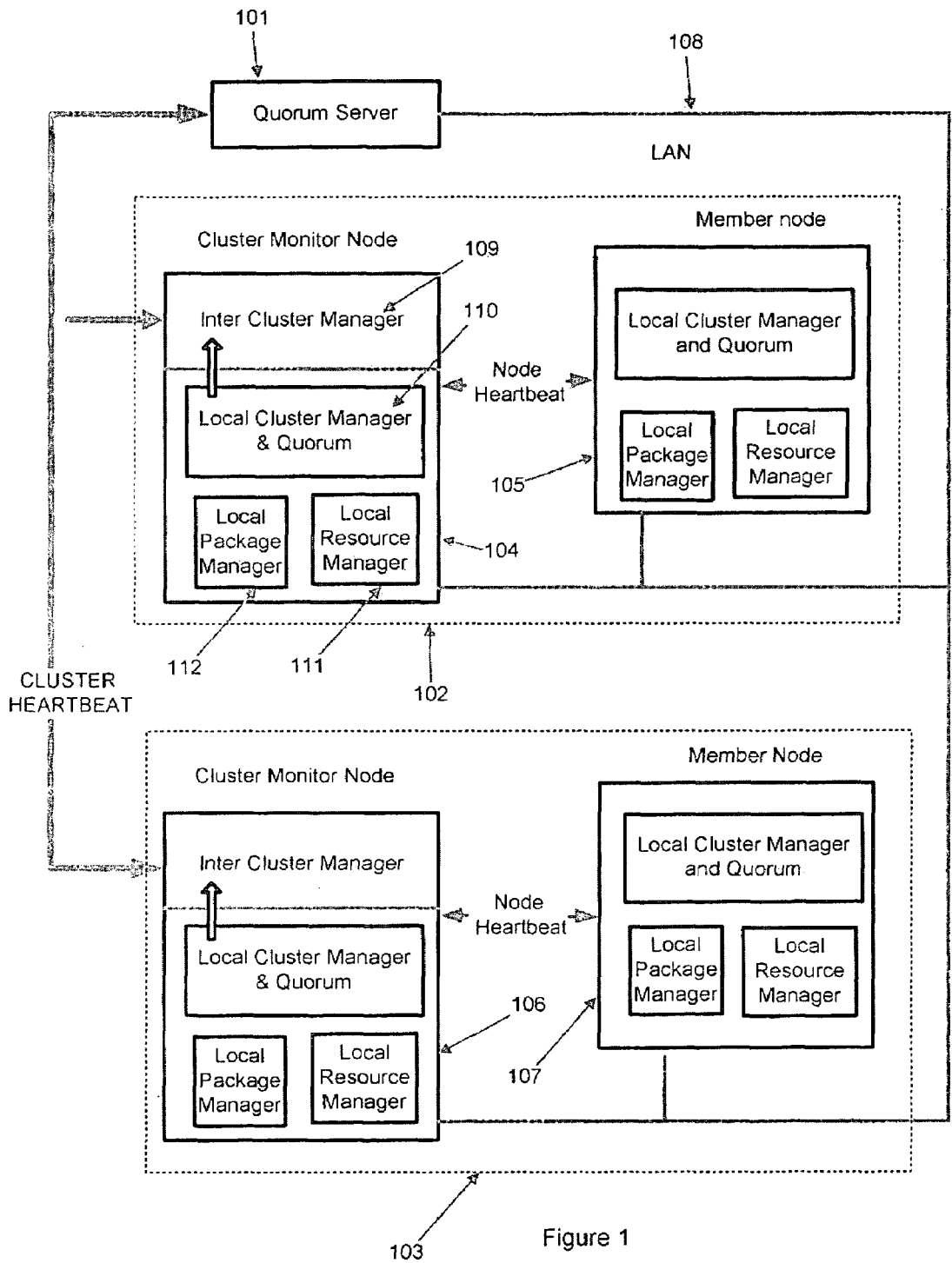
FIG. 1 is a diagram showing an example of an environment in which the present invention may be implemented.

FIG. 1 illustrates computing environment 100 comprising a quorum server 101 and two clusters 102 & 103. The clusters 102 & 103 comprises two member nodes each 104 & 105 and 106 & 107 respectively. The member nodes of a cluster may be a server computer or a computing device. A member node may also be a computing process, so that multiple nodes may exist on the same server, computer or other computing device. A cluster and its elements, may communicate with other nodes in the network through a network communication 108. For example, the network communication 108 is a wired or wireless, and may also be a part of LAN, WAN, or MAN. The communication between member nodes of a cluster may take place through communication interfaces of the respective nodes coupled to network communications 108. The communication between member nodes of a cluster may be through a particular protocol, for example TCP/IP.

The cluster 102 may comprise a cluster monitor node 104 and one or more member nodes 105. The cluster monitor node 104 may be elected from the set of member nodes using any conventional techniques known in the state of the art. The cluster monitor node 104, also referred to as cluster coordinator in the following description, may coordinate the actions among the member nodes of the cluster system. A given cluster 102 can have only one cluster monitor 104.

The cluster coordinator 104 may comprise an inter cluster manager (ICM) 109, a local cluster manager (LCM) 110, a local resource manager (LRM) 111 and a local package manager (LPM) 112. A member node of the cluster 102 may report to the cluster monitor 104 with the status via a node heartbeat message. The heartbeat message from a member node may comprise status of the node and status of the package(s) running on the corresponding node. A heartbeat message may also be exchanged between the member nodes of a cluster. The cluster monitor 104 may compile the cluster heartbeats based on heartbeat messages received from member nodes for exchanging with other available cluster monitors in the network system. If a member node fails to report in time or the node heartbeat message does not reach the cluster monitor, then the node may be classified as failed and an appropriate action may be taken by the cluster monitor to replace or remove the failed node from the network. The cluster monitor may restart all the applications running on the failed node on another healthy member node in the cluster.

The cluster monitor 104 may get a health status of member nodes of the cluster system from the LCM 110 of each member node. The information regarding health of each member node in the cluster and the status of the packages of each member node may be exchanged between the cluster monitors with the help of ICM 109. Each cluster monitor in the network may broadcast a special heartbeat signal for other cluster monitors to convey the status of each of member nodes in the respective cluster system. The health status information received from other clusters in the network system may be stored locally on the cluster monitor and/or may be distributed to the member nodes of the cluster systems. The cluster monitor 104 may update the quorum server 101 and/or the lock disk with the current status of the cluster system. The cluster health status information from the cluster monitors in the network may be consolidated and stored in separate memory device. The cluster health information may also be flushed onto a disk device at predeterminable time period.

The updated cluster configuration information and package configurations are stored on the memory device in a cluster configuration file in xml format. A package configuration is the details of an application along with the resources used by the application. The package configuration may comprise virtual IP address volume groups, device disks for instance. When a package configuration gets updated the memory device is synchronized and the corresponding updates are also made in the xml file. The cluster monitor may periodically check the consistency of package configuration information on disk device with that of the local memory device. The package information stored locally in xml file may be distributed to member nodes in the cluster system and to each of cluster monitors in the network, as and when the information gets changed or updated locally, the xml file may also be updated with all the inputs needed for a cluster formation, including the node selection criteria and its input files.

The cluster monitors in the network may exchange the cluster configuration file at a predeterminable time interval and/or when there are events which may cause changes with respect to current configuration of a cluster, node or package.

The LCM 110 may manage the active node membership of a cluster i.e. send and/or respond to any requests such as requests to form, re-form and/or join a cluster or request other clusters to adopt it by means of merging when the cluster has reduced to a single node and is in a panic state. The LCM 110 layer may also respond to the user commands which may change cluster memberships such as merge two clusters, add a new node to a running cluster, for instance. After cluster formation, the cluster coordinator may ask the LPM 112 to start any packages if configured and assume its job. The LPM 112 may report the status of the packages to the LCM 110 at preconfigurable time period and/or on any events of failure of packages. The LCM 110 may consolidate status of the configuration file status after receiving the recent changes from the LPM and may send a cluster health report to the ICM 109 at regular intervals.

The LCM 109 may also include a quorum service which may provide quorum methods such as a LVM cluster lock, a quorum server, a lock LUN for instance. The quorum service may also prevent a formation of duplicate cluster in the network. The duplicate cluster formation may happen when newly added nodes in the network try to form a failed cluster. This situation may occur when there is a network failure between the clusters. To avoid situations with multiple cluster formation, the quorum server 101 and/or the lock disks may be used as explained below.

The quorum server 101 where the quorum services are run may not be a part of any cluster in the network. The quorum services may not run on any of the cluster member nodes as the failure of the quorum server node may cause in the failure of the cluster as whole. Each newly formed cluster in the network may register itself with the quorum server 101. The quorum server 101 maintains a database which consists of details and status of all clusters and packages running on the clusters. During registration the cluster monitor of the newly formed cluster may convey the cluster information along with package information to the quorum server 101. The cluster monitor may send a cluster heartbeat message to the quorum server 101 periodically. If the quorum server 101 fails to receive any cluster heartbeat message then such cluster may be termed as failed and updated accordingly in its database.

Any node before trying to re-form a failed cluster, may request the quorum server 101 for status of the failed cluster and permission to re-form the said failed cluster. A failed cluster may be re-formed only after getting permission to reform the said from the quorum server 101. Since having a single quorum server 101 may lead to a single point of failure, high availability to the quorum service may be provided by packaging quorum services in a cluster and has the quorum database stored in a shared storage so that there is access to all nodes if hosting the quorum package.

In case of a package failure in a cluster in panic state, which has become isolated from other clusters due to a network element failure, the quorum server 101 may send out a message to all other cluster monitors in the network informing them about the package failure. The cluster monitors then may decide to host the application based on the weights of packages running in them. The cluster monitor who replies first to the quorum server 101 may get the opportunity to start the package. The quorum server 101 then may direct the cluster in panic state to halt.

The quorum server 101 may comprise a lock disk. A lock disk must be acquired by the cluster coordinator during the cluster formation. By acquiring the cluster lock disk, other nodes trying to form the same cluster would be denied lock and hence duplicate cluster formation will not succeed.

The cluster monitor 104 may write the cluster information and status of the packages running, on the cluster lock disk during cluster formation. The information written on the lock disk will be accessible by all nodes in the network. At preconfigurable time intervals, the cluster monitor 104 may update the information written on the lock disk with the current status with a time stamp. When a node other than the cluster monitor 104 finds a cluster to be unreachable, it may try to start the same cluster. The node may read the cluster information on the cluster lock disk. If the time-stamp on the lock disk is well within limits, cluster formation is dropped. When a cluster is reduced to a single node cluster, in panic state with merging enabled and the time-stamp is stale, it waits for a certain amount of time and again tries to communicate through the network with the cluster-monitor owning the cluster lock disk. If communication is successful, the cluster formation process is stopped. If the communication is not be established, a 'cluster_halt' message is communicated to the cluster in panic state by writing on the lock disk and goes into a wait state for a predeterminable period of time. If operations of the cluster in panic state get restored, the cluster in panic state may find the lock disk information with a message to halt. The cluster under panic state may write the cluster and/or package details and a 'halt_agreed' message back on the lock disk for the node trying to re-form the cluster and shuts down. Waking from the wait, a node trying to re-form a failed cluster may check the disk for any messages from a cluster in panic state. If the node trying to reform the cluster finds a 'halt_agreed' message, the cluster reformation process may be started again. If there are no messages written and finds its own message, it again waits for a brief interval of time and reforms the cluster erasing all previous lock information. Hence the quorum service or lock disks become a must if there is more than one cluster.

The LPM 112 may manage the starting, stopping and reacting to changes in packages running on a node. The LPM 112 may respond to user commands and changes state of the system resources. The LPM 112 also may start any configured packages after cluster creation has completed and report the status of the packages running on the node to the LCM 110 at regular time interval. On occurrence of events such as package failover or failures, LPM 112 may immediately inform the LCM 110, so that appropriate actions could be decided by the LCM 110.

On a package creation in a node on any cluster, the LPM 112 is responsible to collect the package information relevant to starting, stopping or monitoring of a package and/or application. The package information may then be provided to the LCM 110 and the cluster monitor may convey the package attributes to all other cluster monitors in the network. By doing this, all clusters in the network may become aware of any new package that has been configured and may easily adopt this new package on failure of the node that was running the package. Thus by configuring a package on a shared storage accessible by all nodes in the network and sharing its start/stop/monitor details, it becomes easy for any node to adopt the package in case of failures.

The member node may also comprise a Local Resourced Manager (LRM) 111. The LRM 111 may be used to monitor the health of the network interfaces, add and remove IP addresses, report Event Management Service (EMS) resource value changes to the LCM so that appropriate action is taken for fail over of packages, exclusive and shared activation support for LVM volume groups or interface to any other volume managers, for instance.

Figure 2:
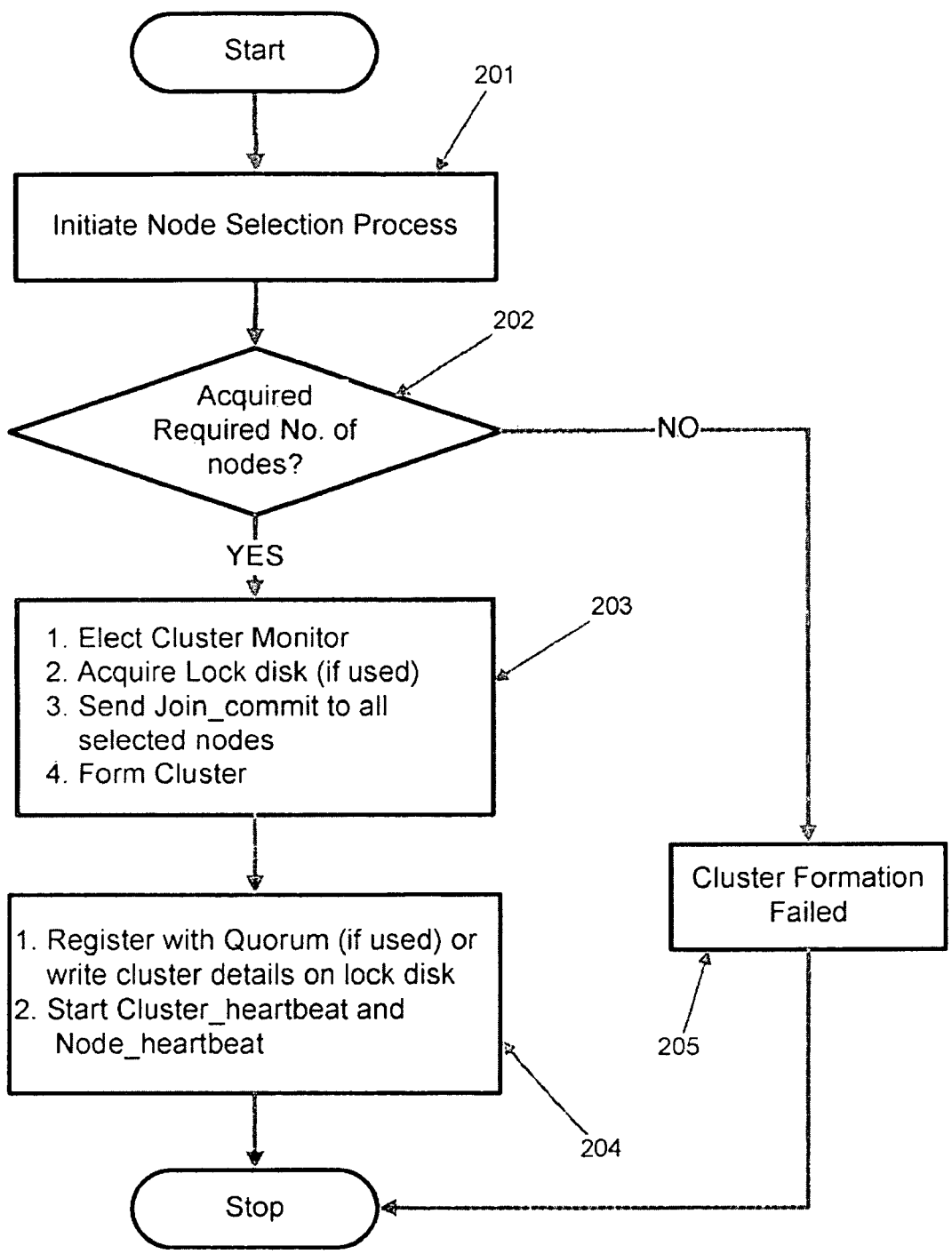
FIG. 2 is a diagram showing the steps of an algorithm for dynamic cluster formation.

FIG. 2 illustrates the steps involved in the process of formation of a cluster 200. The cluster formation may be initiated by the cluster administrator through any node in the network by stating his requirement to be a cluster with 'n' number of member nodes through an Input Configuration file. At step 201, the LCM 110 may take the user commands and begin cluster formation process. The cluster formation may also be triggered by a remote ICM 109 when the ICM 109 finds that a priority cluster is down as it fails to receive cluster heartbeat messages from the failed cluster's ICM 109.

The remote ICM 109 may determine a free node which is not part of any cluster system by reading the local xml file of the node. The ICM 109 then may copy the xml file to the free node and trigger a cluster formation. The LCM 110 on the said node may carry out the procedures to form the cluster. The member nodes for the new cluster system will be selected by the LCM 110 of the node where cluster formation has been triggered, based on the node selection criterion defined by the user. The cluster formation may be initiated after the compilation of the list of member nodes.

At step 202 for FIG. 2, the LCM 110 may check if the required number of nodes for the cluster formation has been acquired. The algorithm for acquiring required number of nodes for cluster formation is explained in details with respect to FIG. 3. After acquiring, the required number of nodes at step 202, the algorithm may proceed to step 203. If the LCM 110 is not able to acquire the required number of nodes, the LCM 110 at step 205 may stop the process of cluster formation.

Continuing to step 203, after acquiring the required number of nodes, the cluster formation process is initiated. The nodes in the cluster may elect a cluster monitor. The cluster monitor may acquire a lock disk and send a join_commit message to the listed nodes thus forming a cluster. A join_commit message is a message to confirm and start cluster joining activities in the requested nodes.

After completion of cluster formation process, the cluster monitor's 104 ICM 109 layer may at step 204 register with the quorum server 101 with cluster information and package details running on the cluster if any. After registration of the new cluster with the quorum server 101, the cluster monitor 104 may start sending cluster heartbeat message to other cluster monitors present in the network.

During the formation of a new cluster, the LCM 110 may read the required input for the cluster formation from the Input Configuration file. The input configuration file may contain the inputs needed for cluster formation such as, selection criterion, node lists etc. All the inputs read from the input configuration file is written to the xml file and shared across all the cluster member nodes and also across new nodes added during cluster re-formation. The input configuration may also be registered with the quorum server during the cluster registration process.

Figure 3:
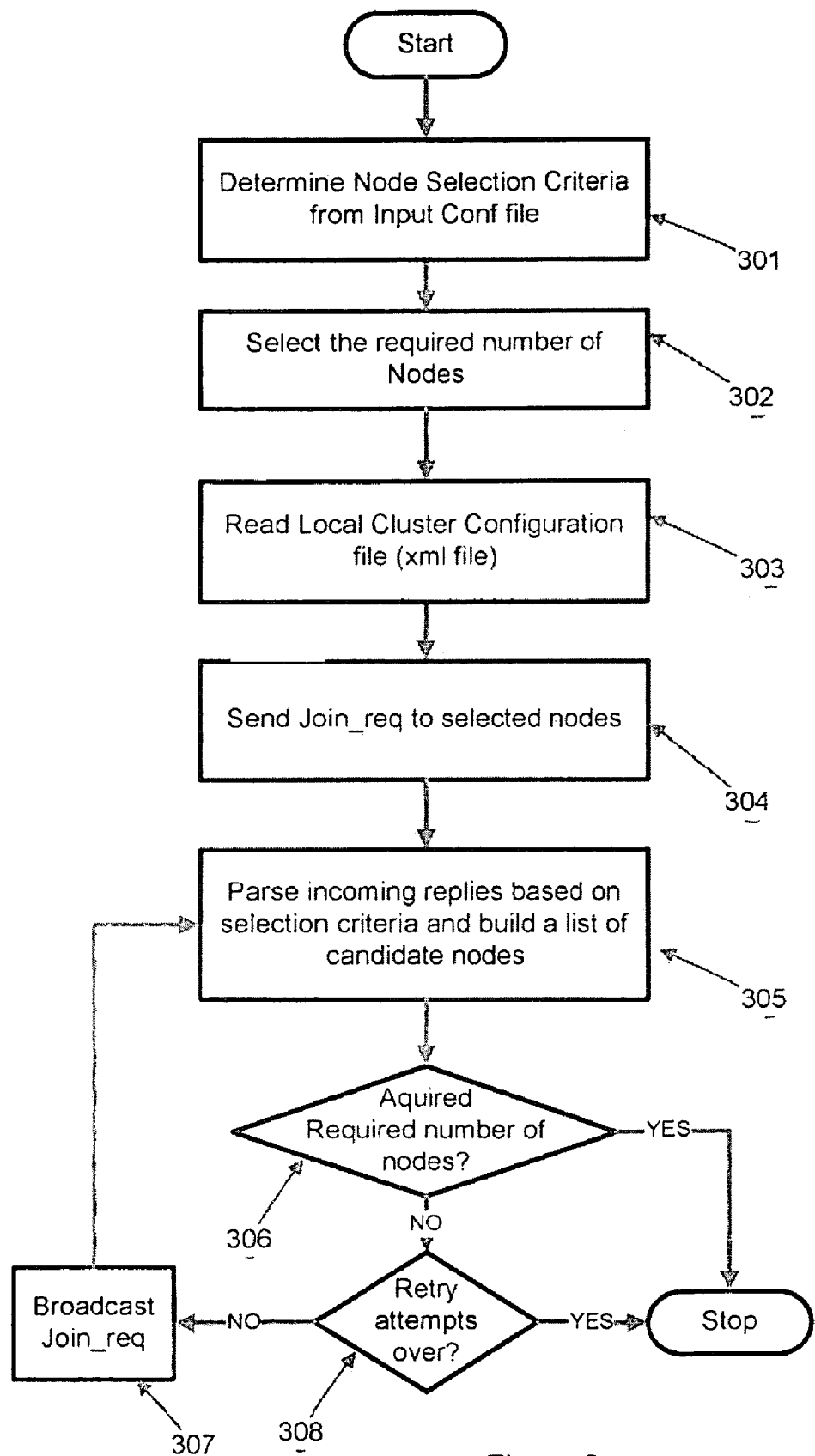
FIG. 3 is diagram showing steps of an algorithm for selecting nodes for cluster formation.

FIG. 3 illustrates the steps involved in the process for selecting nodes for a cluster formation. The LCM 110, at step 301 may read the input configuration file provided by the user and/or remote cluster monitor to determine the node selection criteria.

At step 302, the LCM 110 may select the candidate nodes using node selection criteria to dynamically create and/or reconfigure a cluster system. The selection criteria may comprise hardware probe, user list, capacity adviser, random, for instance.

As an example the user may set a minimum hardware configuration that a cluster member should possess to qualify as member node for a given cluster system. A demon may be started on each node in the network during node startup to collect the underlying hardware information. During cluster creation and/or re-configuration the demons will exchange the hardware information on request with the node where cluster creation was initiated and decide upon the list of nodes that will form a cluster. Once the node list is finalized the LCM 110 initiates the cluster formation and/or re-formation.

As another example the user may give a prioritized list of potential nodes that the LCM 110 may use during cluster formation or re-formation. The LCM 110, depending on the number of nodes required for cluster formation, may request each node in the list in the order mentioned to join new cluster.

As yet another example LCM 110 may use the nodes suggested by a capacity advisor such as Work Load Manager and/or may pick any random node in the network.

Further continuing to step 303 of FIG. 3, the LCM 110 may read the local cluster configuration files stored at cluster coordinator. The cluster configuration file may contain a list of nodes that had broadcast i_am_free message. At step 304, the LCM 110 may send a join_req message to the nodes listed in the local cluster configuration file.

At step 305, the LCM 110 may parse incoming replies based on the selection criteria and build a list of candidate nodes for cluster formation. At step 306, the LCM 110 may check if the number of candidate nodes acquired is same as number of nodes required for cluster formation. If the LCM 110 has acquired the required number of nodes, the cluster will be formed.

At step 306, in case of the acquired number of nodes is not being the same as required number of nodes for cluster formation, the LCM 110 may check if it has any retrial attempts available. If all the retry attempts have been exhausted the number of retrial attempts available the process of cluster formation may stop. The number of retry attempts may be declared by the user.

At step 308, the LCM 110 may broadcast the join_req message again if there are any available retrial attempts. This cycle may be repeated till the cluster is formed or the number of attempts to form a cluster is over.

Figure 4A:
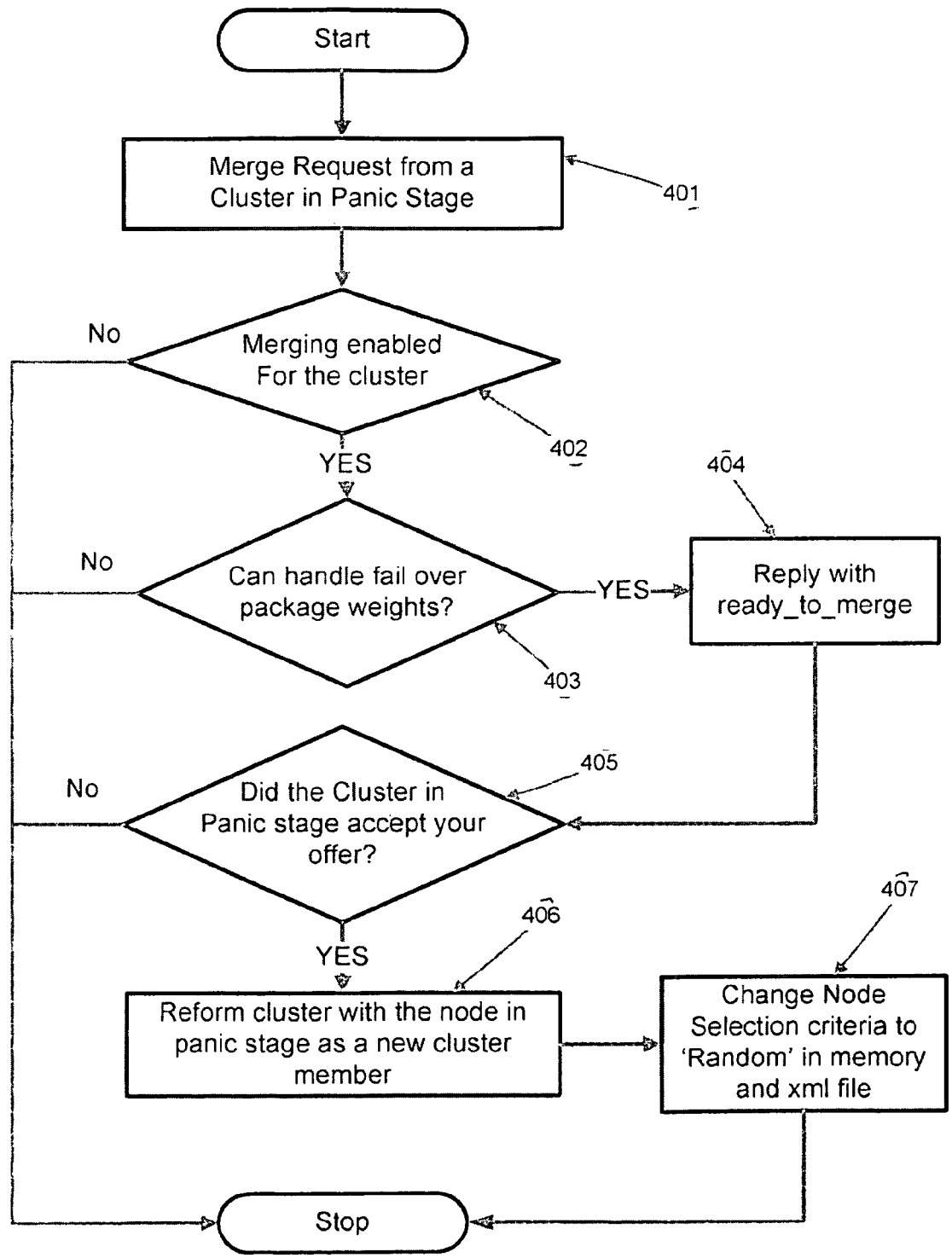
FIG. 4a is a flow chart illustrating the steps involved in an algorithm for automatic cluster re-formation from a cluster in panic state.
Figure 4B:
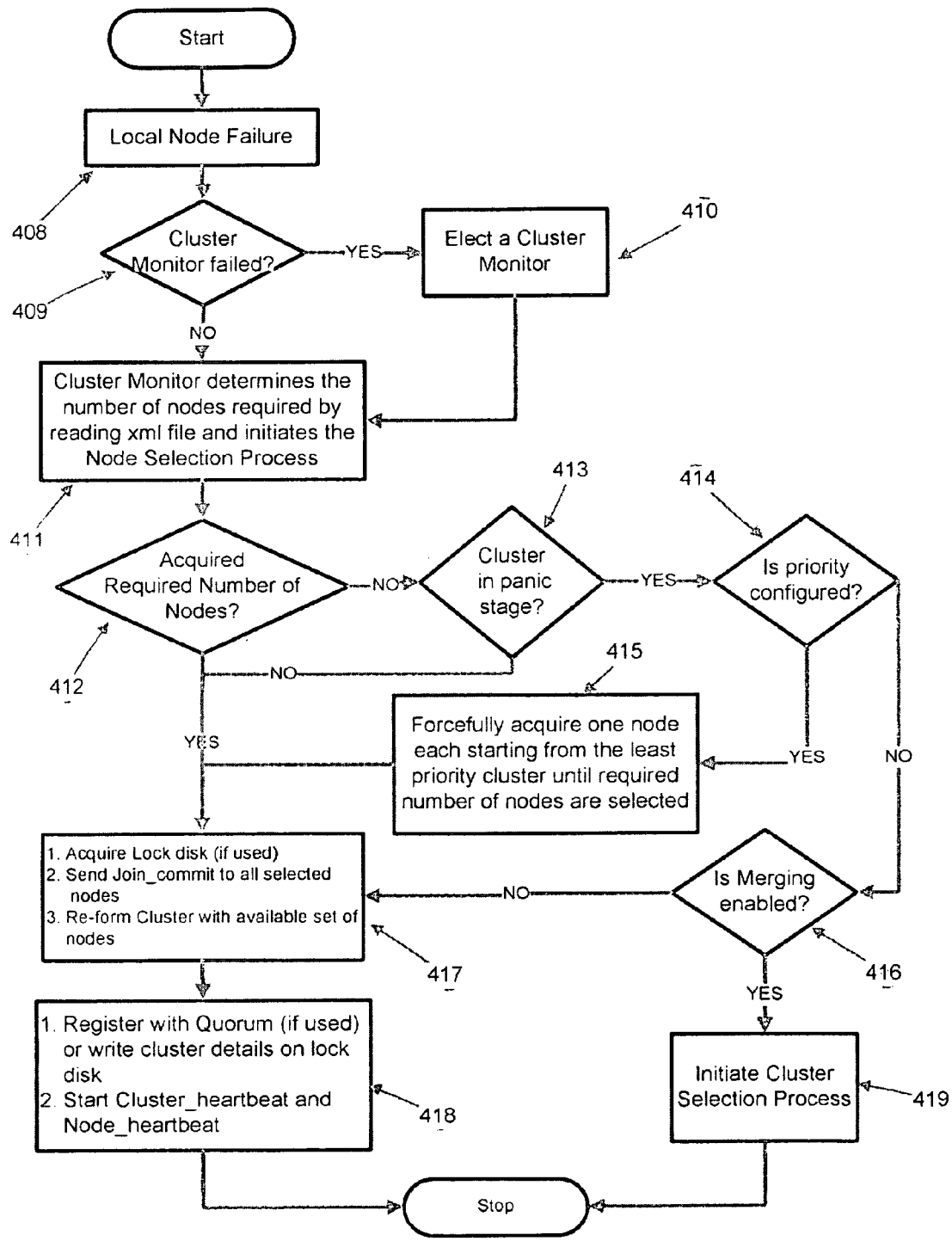
FIG. 4b is a diagram showing the steps of an algorithm for automatic cluster re-formation using free nodes.

FIGS. 4a and 4b illustrates the algorithm for automatic cluster reconfiguration 400. During the cluster reconfiguration process 400, the LCM 110 attempts to maintain a constant number of member nodes in case of node failure. A node is assumed to have failed and/or not reachable when the heartbeat message of the node fails to reach other cluster members either due to the node going down or break in the network. The LCM 110, in case of node failure may reconfigure the cluster by removing the failed node from the cluster and bring in another machine in the network into the cluster and start the failed package. By doing this the risk of cluster failure, due to the failure of nodes will be mitigated and a constant number of nodes can be maintained in a cluster. A constant number of nodes will be needed in case of applications which need more than one node or where high load balancing is intended. In case of a node failure another node may be brought as soon as possible in the cluster not to affect availability and load balance equations at any point in time.

A cluster with failed nodes may have an option to either join another cluster in the network or invite other nodes in the network to restart the packages. FIG. 4a illustrates steps of an algorithm for a cluster with reduced number of nodes, also referred as single node cluster in this description, to merge with another incomplete cluster in the network to form a new cluster. The single node cluster may broadcast a panic message along with the package weight of the failed package(s). At step 401 the clusters in the network may receive a merge request from the single node cluster. After receiving the merge request all the clusters in the network at step 402 may check if merging is enabled for their cluster. If merging is not enabled the cluster may stop the process of merging. If merging is enabled then the algorithm may proceed to step 403.

At step 403 the cluster may determine the maximum package weight that can be run in its cluster. Thus the cluster may check if it can handle fail over package weights. If cluster cannot handle the failover package weights, the process of merging may be stopped. If the package weight of the failed package is less than the maximum allowable package weight on the cluster, then a ready_to_adopt message 404 is replied to the cluster in panic state.

At step 405, cluster in panic state may accept the ready_to_adopt offer from the other available cluster and a new cluster may be formed with the cluster in panic stage as new cluster member 406. The single node cluster may initiate the process of joining with the cluster in the network whose cluster monitor replied first with ready_to_adopt message. The cluster monitor of the newly formed cluster may change node selection criteria to random in memory and xml file 407 of the new cluster.

FIG. 4b illustrates steps of an algorithm for a cluster with reduced number of member nodes attempting to maintain a constant number of nodes by inviting available and/or free nodes in the network to join. The process for cluster re-formation may start when a local node fails 408. The failed node may be removed from the cluster.

At step 409, the process may determine if the failed node is a cluster monitor node. If the failed node is a cluster monitor node, the remaining nodes in the cluster system may at step 410 elect a new cluster monitor. The newly elected cluster monitor may check the local xml file or cluster status in its memory for the requirement that is set by the user for the cluster and compare with the current status. The cluster monitor may determine that the cluster is not complete. At step 411 the cluster monitor may determine the number of nodes required by reading xml file and initiate the node selection process. The cluster monitor may probe for a new node in the network using any of the previously explained selection criteria with respect to FIG. 3 and acquire the required number of nodes.

At step 412, the process may determine if it has acquired the required number of nodes for cluster formation. If the process has acquired the required number of nodes during the selection process, they will be added as cluster member nodes and cluster formation will be complete.

If required number of nodes is not acquired, the process at step 413 may check if the cluster has been reduced to a single node cluster i.e. cluster is in panic stage. If the cluster has been reduced to a single node cluster, the cluster monitor at step 414 may check if there is any priority set for the cluster. If there is a priority set for the cluster then the cluster monitor at step 415 may look for the lower priority clusters and acquire nodes from it. The cluster monitor may forcefully acquire one node each starting from the lowest priority cluster until required number of nodes for cluster reformation are selected.

If no priority is configured with the cluster, the cluster monitor at step 416 may check if merging is enabled for the cluster. If merging is enabled, the cluster monitor at step 419 may initiate cluster selection process by broadcasting a panic message along with the package weight of the failed packages.

If cluster is not able to acquire the required number of nodes, then the cluster may be reformed with the available set of nodes. As and when a node becomes free in the network, the free node may broadcast a message indicating that the node is ready to join any cluster. When a cluster monitor in the network receives ready to join message, they may begin the node selection process and reconfigure the cluster if the new node meets the opted selection criteria used in the cluster.

At step 417, the cluster monitor of the newly formed cluster may acquire the lock disk. If the lock disk for the cluster is available, the cluster monitor may send a join_commit message to all selected nodes and reform the cluster. At step 418, the newly formed cluster may register with the quorum server and/or may write cluster details on the lock disk. The member nodes of the cluster may start sending node heartbeats to the cluster monitor and cluster monitor may also start broadcasting the cluster heartbeat.

Figure 5:
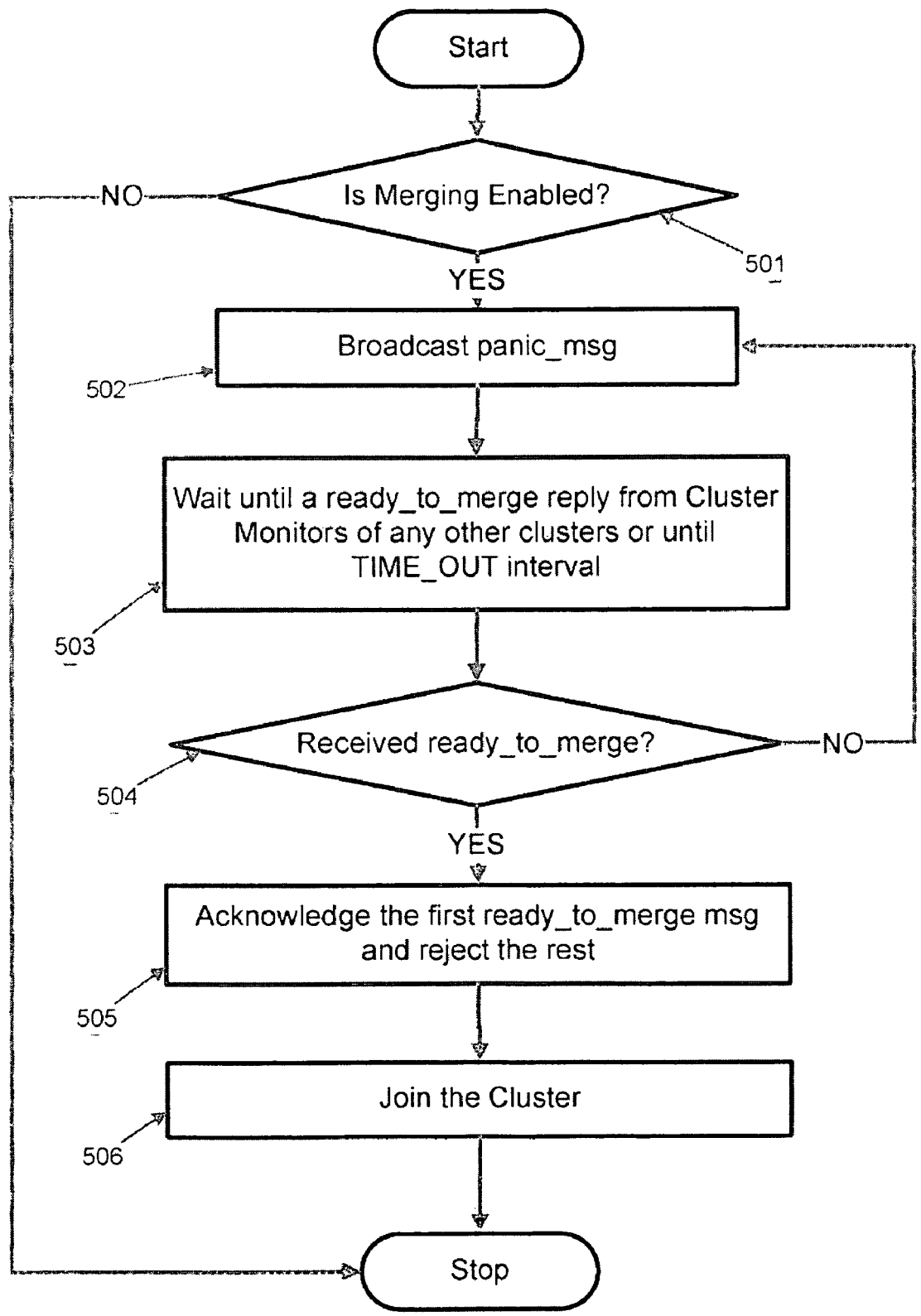
FIG. 5 is a diagram showing the steps of an algorithm for cluster selection process by a node in panic state.

FIG. 5 illustrates the steps for an algorithm 500 for selecting an available cluster in the network for merging by a cluster in panic stage. A cluster is said to be in a panic state, when the cluster has reduced to a single node cluster i.e. all member nodes has failed. Merging may be enabled for a single node cluster in order to maintain high availability by merging with a cluster to avoid downtime of the applications running from node failures. When a cluster gets reduced to a single node cluster, there may always be a risk of unplanned downtime due to package failure or the node failure. To avoid such a downtime due to cluster failure, the single node cluster may decide to merge with any other healthy clusters in its network if it could not find node(s) to complete its cluster during automatic cluster re-formation.

At step 501 of FIG. 5, the algorithm may check if the merging is enabled at the single node cluster. If merging is not enabled, the algorithm may stop the process of selecting a cluster in the network for merging. In case of merging being enabled at the single node cluster, the algorithm may proceed to step 502.

At step 502, the single node cluster may broadcast a panic_msg to the available clusters in the network. The panic_msg is a message sent to request other available clusters in the network to adopt the sender, which is a single node cluster in panic state. At step 503, the single node cluster may after broadcasting the panic_msg wait for a predeterminable period of time to receive a ready_to_merge message from any available cluster in the network. A ready_to_merge is a message sent by a cluster in the network which is ready to adopt the single node cluster in panic state along with its packages.

Continuing to step 504, the single node cluster may check if it has received any ready_to_merge message from a cluster in the network before the timeout of the predetermined time interval. If the single node cluster has not received a ready_to_merge message the algorithm may precede to step 502 and may broadcast a panic_msg again. The above cycle may be repeated until the single node cluster has received a ready_to_merge message.

Further continuing to step 505, on receiving a ready_to_merge message from a cluster in the network, the single node cluster may send an acknowledgement. The single node cluster may join the cluster and may reject the other ready_to_merge messages received.

Figure 6:
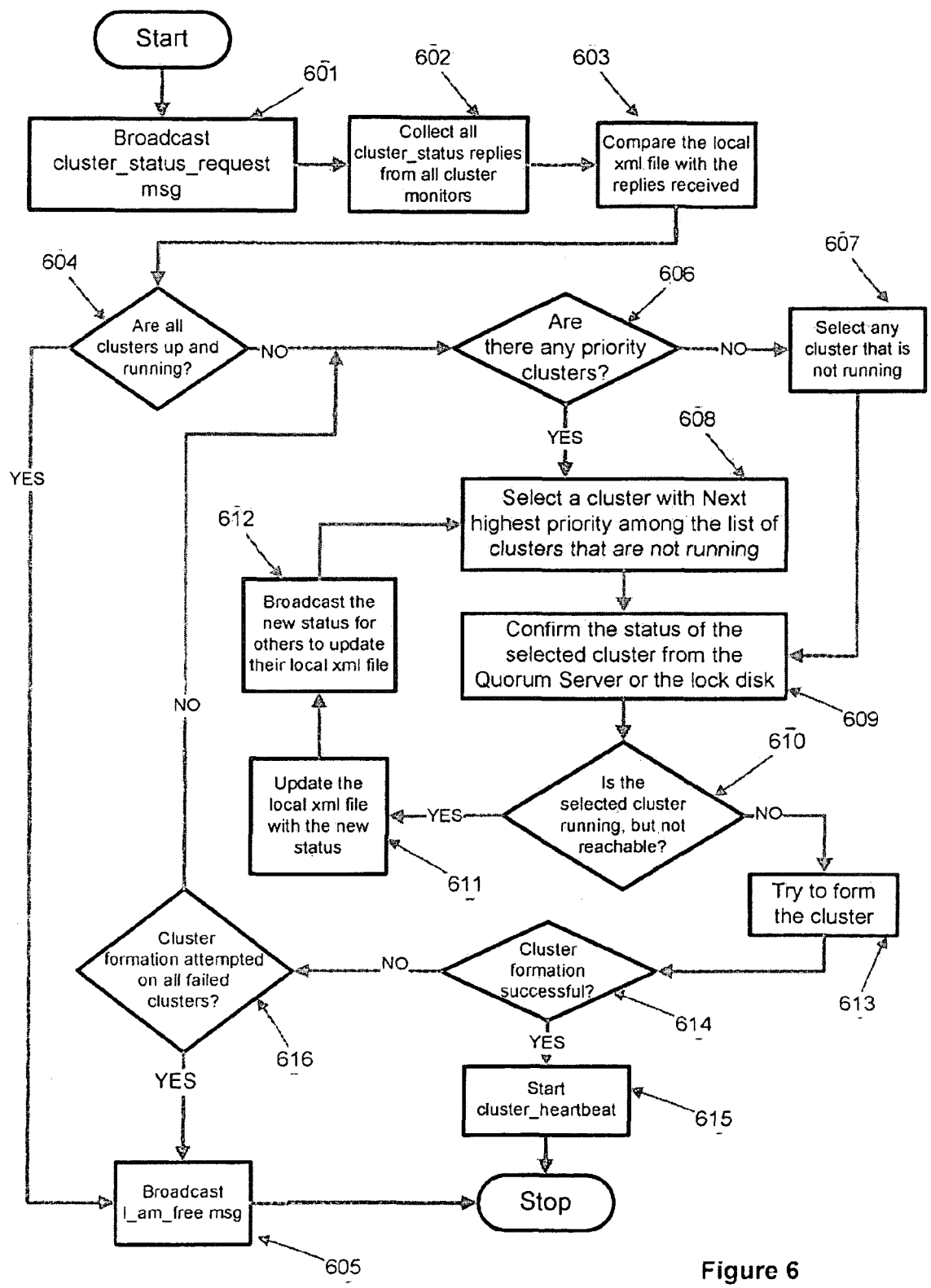
FIG. 6 is a diagram showing the steps of an algorithm for a node to form a cluster after a boot or re-boot.

FIG. 6 illustrates an algorithm for a node to form a cluster after a boot or re-boot. When a node boots and/or reboots, it may not be a part of any cluster and not aware of current cluster status. At step 601 the node may broadcast a cluster_status_request message for all clusters in the network requesting to reply with their cluster heartbeats. The available clusters in the network may reply in response to the cluster_status_request message.

At step 602, the node may collect the cluster_status replies from the cluster monitors in the network. The node may later request the xml file from one of the cluster monitors which had replied to cluster_status_request message. The node at step 603 may parse all the incoming status messages from the cluster monitors in the network and compare with the xml file.

At step 604, the cluster status may be determined by the node by comparing the xml file. If all the clusters in the network are running, properly i.e. no cluster is found down or not able to bring up any cluster which is down, the algorithm may proceed to step 605 and the node which initiated the cluster formation may broadcast i_am_free message. If the node finds any cluster to be down, it may try to start the cluster.

At step 606, the node may check if any priority cluster is down in the network. The information about priority cluster may be available through the xml file of the clusters sent by the respective cluster monitor. If there is any, the node at step 608 may select a cluster with highest priority, among the list of clusters that are not running and try, to form the priority cluster by gathering required number of nodes. If there are no priority clusters, the algorithm at step 607, may pick any cluster which is down and will try to start.

The priority of a cluster may be calculated based on the priority set to the packages running on the cluster. Each package is configured with a priority number which is a measure of the importance or criticality of the packages. The priority number may be configured during the package creation. Once the package is up and running, all package parameters including priority is written into xml file. Each cluster in the network automatically is set with a priority. The cluster parameters including the calculated priority of the cluster are written onto the xml file.

Continuing to step 609, when a failed cluster is being restarted, the node trying to form the cluster may request the quorum or reads from the lock disk the current condition of the cluster. At step 610, the node may check if the selected cluster is running but is not reachable through network. If the selected cluster is running but not reachable, the node trying to form the cluster at step 611 will give up the cluster formation and may update the status of the selected cluster in the xml file. At step 612, the node trying to form the cluster may broadcast the new status of the selected cluster for other clusters in the network to update their xml file and will proceed to step 608 to select a cluster with next highest priority for forming a cluster.

At step 613, the node may try to restart the cluster if it is seen that the cluster has not updated the quorum or the lock disk with its status for a predetermined period of time. Continuing to step 614, the node may check the status of cluster formation. If the cluster is restarted and/or formed successfully, the cluster monitor for newly formed cluster may start broadcasting the cluster_heartbeat messages and will stop the process for cluster reformation. Further continuing at step 615, if the required numbers of nodes were gathered and the cluster was not formed successfully, the cluster may be declared failed until the user or administrator takes any necessary action to restart the failed clusters. The node trying to form cluster may also check if the cluster formation has been attempted for all failed clusters in the network. If there is a failed cluster in the network, the node may go to step 606 and try forming the failed cluster. If no cluster is found down and/or not able to bring up any cluster which is down, the node which initiated the cluster formation, at step 605 may stop the process for cluster formation and broadcast i_am_free message.

Figure 7:
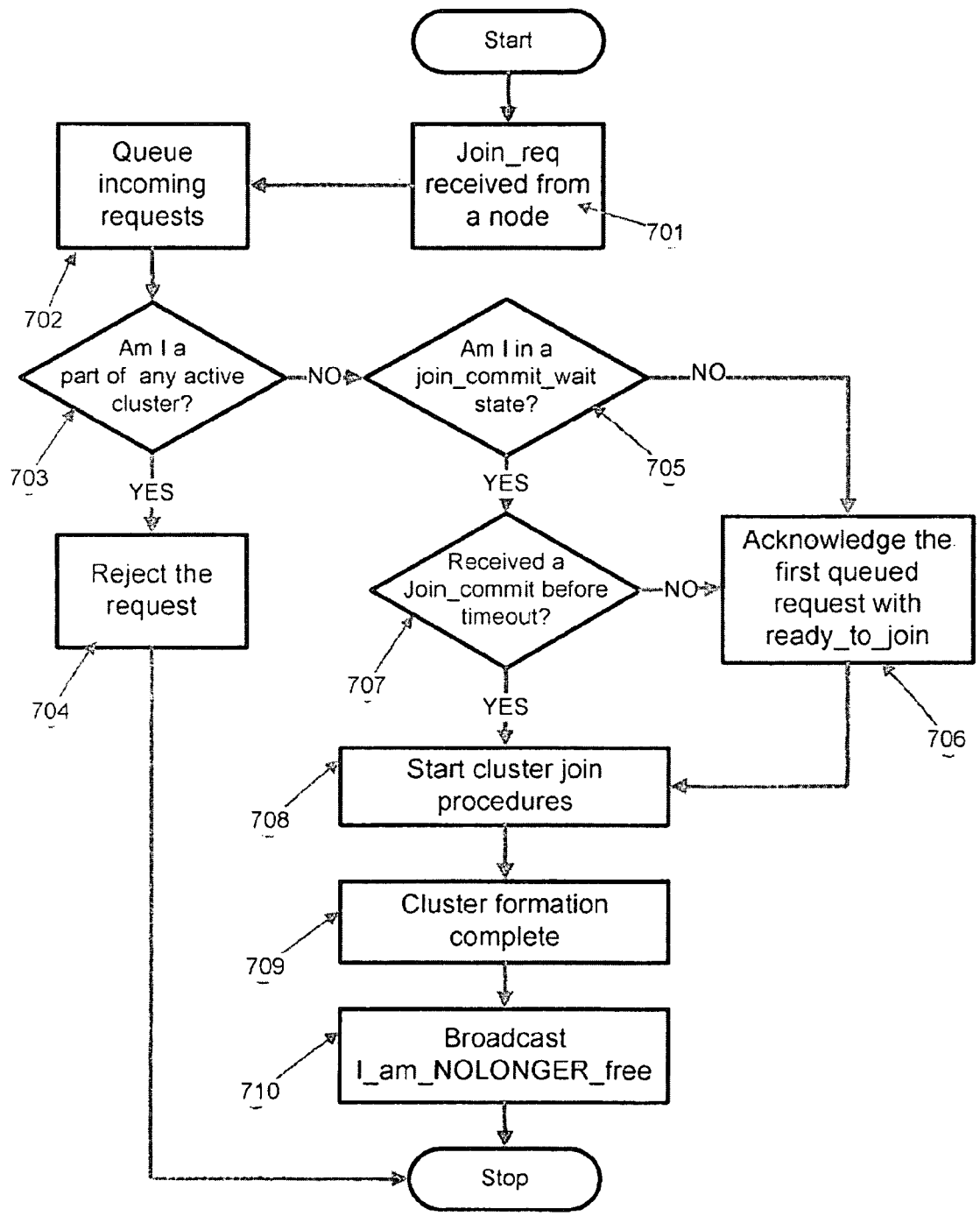
FIG. 7 is a schematic of a flow diagram illustrating the steps to join cluster on receiving any cluster join request.

FIG. 7 illustrates an algorithm 700 for selecting a cluster by a node after receiving request to join a cluster (join_req) messages. A join_req message is a message sent to the nodes in the network by a cluster monitor requesting the nodes to be member of the said cluster. At step 702, the incoming join-req messages from all of the cluster coordinators in the network are listed in a queue on the node. The node at step 703, may verify if it is a part of any active and running cluster. If the node is a part of an active cluster, the node will reject the received the join-request messages. In case of node not being a part of any active cluster, the node may proceed to step 705 in order to join the said cluster.

At step 705 of FIG. 7, the node may verify if it is in the state of join_commit_wait. The join_commit_wait state is a waiting state of a node after sending a ready_to_join message to a cluster monitor and waiting for the join_commit message from the cluster monitor. Continuing to step 706, if the node is not in the state of join_commit_wait, it may send a response to the cluster monitor of the first join_req message stored in the queue with a ready_to_join message. The ready_to_join message is sent to a cluster monitor a willingness to join the cluster as a member node.

At step 705, if the node is in a state of join_commit_wait, the said node may wait for a predeterminable time to receive a join_commit message from a cluster monitor 707. In case of node not receiving a join_commit message from a cluster coordinator, the node may continue to step 706 and respond to the first join_req in the queue with a ready_to_join message.

Continuing at step 708, after receiving the join_commit message from the cluster coordinator at step 707, the node may start the procedure to join the cluster. At step 709, the cluster formation is complete after the node has joined the cluster. The node may at step 710 broadcast I_am_nolonger_free message in the network. The I_am_nolonger_free message is a message sent by a node which had earlier sent an I_am_free message after node becomes a part of a cluster. The cluster coordinator may register itself with the quorum server and acquire the lock disk to avoid the formation of a duplicate cluster.

The technique disclosed herein may provide a higher level of availability by providing high availability to clusters rather than the applications alone. The technique may also automate the cluster creation thereby avoiding the panic situations on a node failure, as the cluster failure may be mitigated to a larger extent. Other advantages of the disclosed technique may include sharing of redundant hardware across multiple clusters and constant level of load balancing by maintaining a constant number of member nodes in the cluster.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

The invention claimed is:

1. A method for forming a dynamic cluster with a plurality of nodes in a network, comprising:
   identifying a free node in the plurality of nodes by a remote inter cluster manager residing in a remote cluster monitor node;
   copying a configuration file to the free node by the remote inter cluster manager, wherein the configuration file comprises information selected from the group consisting of node selection criteria and a required number of nodes of the plurality of nodes;
   acquiring, by a local cluster manager residing in the free node, the required number of nodes for forming the dynamic cluster based on the node selection criteria in the configuration file; and
   forming the dynamic cluster using the acquired nodes and the free node by the local cluster manager, wherein forming the dynamic cluster using the acquired or nodes and the free node comprises:
   electing a cluster monitor node from a group consisting of the acquired nodes and the free node; and
   sending, by the cluster monitor node, a message to each of remaining nodes in the group to join the dynamic cluster; and
   registering the dynamic cluster with a quorum server and acquiring a lock disk from the quorum server to prevent a formation of a duplicate cluster in the network.

2. The method of claim 1, wherein the cluster monitor runs cluster services and wherein the cluster services comprise an inter cluster manager, the local cluster manager, quorum services, a local package manager and a local resource manager, wherein the quorum services comprise information to prevent the formation of the duplicate cluster in the network.

3. The method of claim 1 further comprising starting the package services on the dynamic cluster, wherein the package services include starting, stopping or monitoring of an application.

4. The method of claim 3 further comprising registering cluster information and package information running on the dynamic cluster with the quorum server.

5. The method of claim 1, wherein the request to create a dynamic cluster in the network is initiated by a cluster administrator.

6. The method of claim 1, wherein the required number of nodes are acquired based on a minimum hardware configuration.

7. The method of claim 1, wherein the required number of nodes are acquired based on a prioritized list of nodes provided by an administrator.

8. The method of claim 1, wherein the required number of nodes are acquired based on suggestions from a work load manager.

9. The method of claim 1, wherein the required number of nodes are acquired randomly from available nodes in the network.

10. The method of claim 1, wherein acquiring the required number of nodes comprises:
    determining the node selection criteria from the configuration file;
    sending a request to join to available nodes in the network;
    parsing incoming replies in response to the request based on the node selection criteria; and
    building a list of candidate nodes.

11. The method of claim 10 further comprising if there are no nodes available in the network then forcibly acquiring nodes from a low priority cluster.

12. The method of claim 10, wherein the node receiving a request to start cluster is a single node cluster in a panic state, wherein a cluster is said to be in the panic state, when the cluster reduces to the single node cluster.

13. The method of claim 10, wherein the node selection criteria comprise one or more of minimum hardware configuration, prioritized list of potential nodes provided by an administrator, nodes suggested by work load managers and nodes acquired randomly from available nodes in the network.

14. A method for forming a cluster after booting or rebooting a node, comprising:
    broadcasting, by the node, a message requesting a status of each cluster in a network;
    receiving and parsing, by the node, replies from cluster monitor nodes of each cluster in response to the requested message;
    determining a list of clusters that are down based on the replies received from the cluster monitor nodes, wherein the node requests a configuration file from the cluster;
    selecting a cluster with a high priority from the list of clusters;
    acquiring a required number of nodes for the selected cluster based on parameters in the configuration file;
    reforming the selected cluster by starting cluster services on the acquired nodes;
    electing a cluster monitor node from the reformed cluster;
    broadcasting, by the cluster monitor node, a new status of the reformed cluster to other clusters in the network for updating respective configuration files associated with each of the other clusters; and
    registering the reformed cluster with a quorum server and acquiring a lock disk from the quorum server to prevent a formation of a duplicate cluster in the network.

15. The method of claim 14, wherein parsing the replies comprises comparing the replies from the cluster monitor nodes with a configuration file stored on the node.

16. The method of claim 14, wherein the cluster is selected based on a priority configured with the clusters.

17. The method of claim 1, further comprising merging a node in a panic state with the dynamic cluster, comprising:

broadcasting, by the node in the panic state, a request to merge including a package weight to each cluster in the network, wherein a cluster is said to be in the panic state, when the cluster reduces to a single node;

receiving, by the dynamic cluster, the request to merge from the node in the panic state in the network;

checking, by the dynamic cluster, the ability to handle the package weight of the node in the panic state; and sending, by the dynamic cluster, a ready to merge message to the node in the panic state and reforming the dynamic cluster with the node in the panic state as new cluster member.

18. The method of claim 17, wherein the node in the panic state is a cluster with reduced number of nodes.

19. A system for forming a dynamic cluster with at least one another node comprising:

a network;

a plurality of nodes in the network, wherein each node comprises one of a server computer and a computing device; and a remote cluster monitor node including a remote inter cluster manager for identifying a free node in the plurality of nodes and copying a cluster configuration file to the free node, wherein the cluster configuration file comprises information selected from the group consisting of node selection criteria and a required number of nodes of the plurality of nodes, wherein the free node comprises:

a local cluster manager stored therein for acquiring the required number of nodes for forming the dynamic cluster based on the node selection criteria in the cluster configuration file and forming the dynamic cluster by electing a cluster monitor node from a group consisting of the acquired nodes and the free node, and wherein the cluster monitor node sends a message to each of remaining nodes in the group to join the dynamic cluster, and wherein the cluster monitor node registers the dynamic cluster with a quorum server and acquires a lock disk from the quorum server to prevent a formation of a duplicate cluster in the network.

20. The system of claim 19 wherein the local cluster manager comprises:

local package manager for managing starting, stopping and reacting to changes in packages; and local resource manager for monitoring health of the network interface, IP address services, reporting event management service resource value changes and activation support for logical volume manager (LVM) groups.

21. A computer program product for forming a dynamic cluster with a plurality of nodes in a network, the computer program product comprising a non-transitory computer readable storage medium readable by a processing circuit and storing instruction for execution by a processing circuit for performing a method comprising:

identifying a few node in the plurality of nodes by a remote inter cluster manager residing in a remote cluster monitor node;

copying a configuration file to the free node by the remote inter cluster manager, wherein the configuration file comprises information selected from the group consisting of node selection criteria and a required number of nodes of the plurality of nodes;

acquiring, by a local cluster manager residing in the free node, the node, the required number of nodes for forming the dynamic cluster based on the node selection criteria in the configuration file; and forming the dynamic cluster using the acquired nodes and the free node by the local cluster manager, wherein forming the dynamic cluster using the acquired or nodes and the free node comprises:

electing a cluster monitor node from a group consisting of the acquired nodes and the free node; and sending, by the cluster monitor node, a message to each of remaining nodes in the group to join the dynamic cluster; and registering the dynamic cluster with a quorum server and acquiring a lock disk from the quorum server to prevent a formation of a duplicate cluster in the network.

22. The computer program product of claim 21 further comprising starting the package services on the dynamic cluster, wherein the package services include starting, stopping or monitoring of an application.

23. The computer program product of claim 21, wherein acquiring the required number of nodes comprises:

determining the node selection criteria from the configuration file;

sending a request to join to available nodes in the network;

parsing incoming replies in response to the request based on the node selection criteria; and building a list of candidate nodes.

24. The method of claim 1, wherein the quorum server includes a database containing details of all clusters in the network.

* * * * *